United States Patent
Glenney

(10) Patent No.: US 6,561,020 B2
(45) Date of Patent: May 13, 2003

(54) METHOD TO CALCULATE SIDESLIP ANGLE AND CORRECT STATIC PRESSURE FOR SIDESLIP EFFECTS USING INERTIAL INFORMATION

(75) Inventor: Kevin Glenney, Bloomington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 09/850,863

(22) Filed: May 8, 2001

(65) Prior Publication Data

US 2003/0015032 A1 Jan. 23, 2003

(51) Int. Cl.[7] .................................................. G01W 1/00

(52) U.S. Cl. ................................ 73/170.02; 73/170.05; 73/180

(58) Field of Search ..................... 73/170.07, 170.11, 73/488, 504.03, 514.11, 514.01, 511, 514.02; 364/424, 424.028; 244/181, 194, 177

(56) References Cited

U.S. PATENT DOCUMENTS

| | | | |
|---|---|---|---|
| 3,318,146 A | | 5/1967 | DeLeo et al. |
| 4,096,744 A | | 6/1978 | DeLeo et al. .................. 73/180 |
| 4,378,696 A | | 4/1983 | DeLeo et al. .................. 73/180 |
| 4,378,697 A | | 4/1983 | DeLeo et al. .................. 73/182 |
| 5,205,169 A | | 4/1993 | Hagen .......................... 73/180 |
| 5,319,970 A | | 6/1994 | Peterson et al. ............... 73/182 |
| 5,485,412 A | | 1/1996 | Sarkkinen et al. ...... 364/724.05 |
| 5,790,405 A | * | 8/1998 | Buchler ....................... 364/453 |
| 5,852,237 A | * | 12/1998 | Renshaw ...................... 73/180 |
| 6,176,130 B1 | * | 1/2001 | Nakaya et al. ................ 73/182 |
| 6,273,370 B1 | * | 8/2001 | Colgren ....................... 244/181 |

OTHER PUBLICATIONS

BFGoodrich–Aircraft Sensors Division Air Data System with SmartProbe for Fairchiled Dornier 728JET, BFGoodrich–Rosemount Aerospace, Addendum to D9820217 Rev. B, Oct. 1998, pp. 1–10.
"SmartProbe™ Air Data System for Embraer ERJ–170 & 190", BFGoodrich–Aircraft Sensors Division, Proposal D9920133, Apr. 1999, pp. 1–65.
F.W. Hagen and Dr. H. Seidel, "Deutsche Airbus Flight Test of Rosemount Smart Probe for Distributed Air Data System", IEEE AES Systems Magazine, Apr. 1994, pp 7–14.
Bulletin 1013, "Pitot and Pitot–Static Probes", BFGoodrich (May 1998).
T.J. Rohloff, S.A. Whitmore and I. Catton, "Air Data Sensing from Surface Pressure Measurements Using a Neural Network Method", AIAA Journal, Vo. 36, No. 11, Nov. 1998, pp. 2095–2101.
T.J. Rohloff, S.A. Whitmore and I. Catton, "Fault–Tolerant Neural Network Algorithm for Flush Air Data Sensing", Journal of Aircraft, vol. 36, No. 3, May–Jun. 1999, pp. 541–549.
T.J. Rohloff and I. Catton, "Fault Tolerance and Extrapolation Stability of a Neural Network Air–Data Estimator", Journal of Aircraft, vol. 36, No. 3, May–Jun. 1999, pp. 571–576.

* cited by examiner

Primary Examiner—Hezron Williams
Assistant Examiner—Andre Allen
(74) Attorney, Agent, or Firm—Westman, Champlin & Kelly, P.A.

(57) ABSTRACT

A method of the invention allows the determination of aircraft sideslip using an air data probe and an inertial reference unit. A lateral sideslip component $\beta_L$ of the aircraft is calculated as a function of inertial flight information. An angular sideslip component $\beta_A$ of the aircraft is also calculated as a function of inertial flight information. The lateral sideslip component $\beta_L$ and the angular sideslip component $\beta_A$ are combined to obtain a total sideslip angle $\beta_{TOTAL}$ for the aircraft. The total sideslip angle $\beta_{TOTAL}$ can be used to compensate static pressure, angle of attack and other aircraft parameters for sideslip effects.

23 Claims, 5 Drawing Sheets

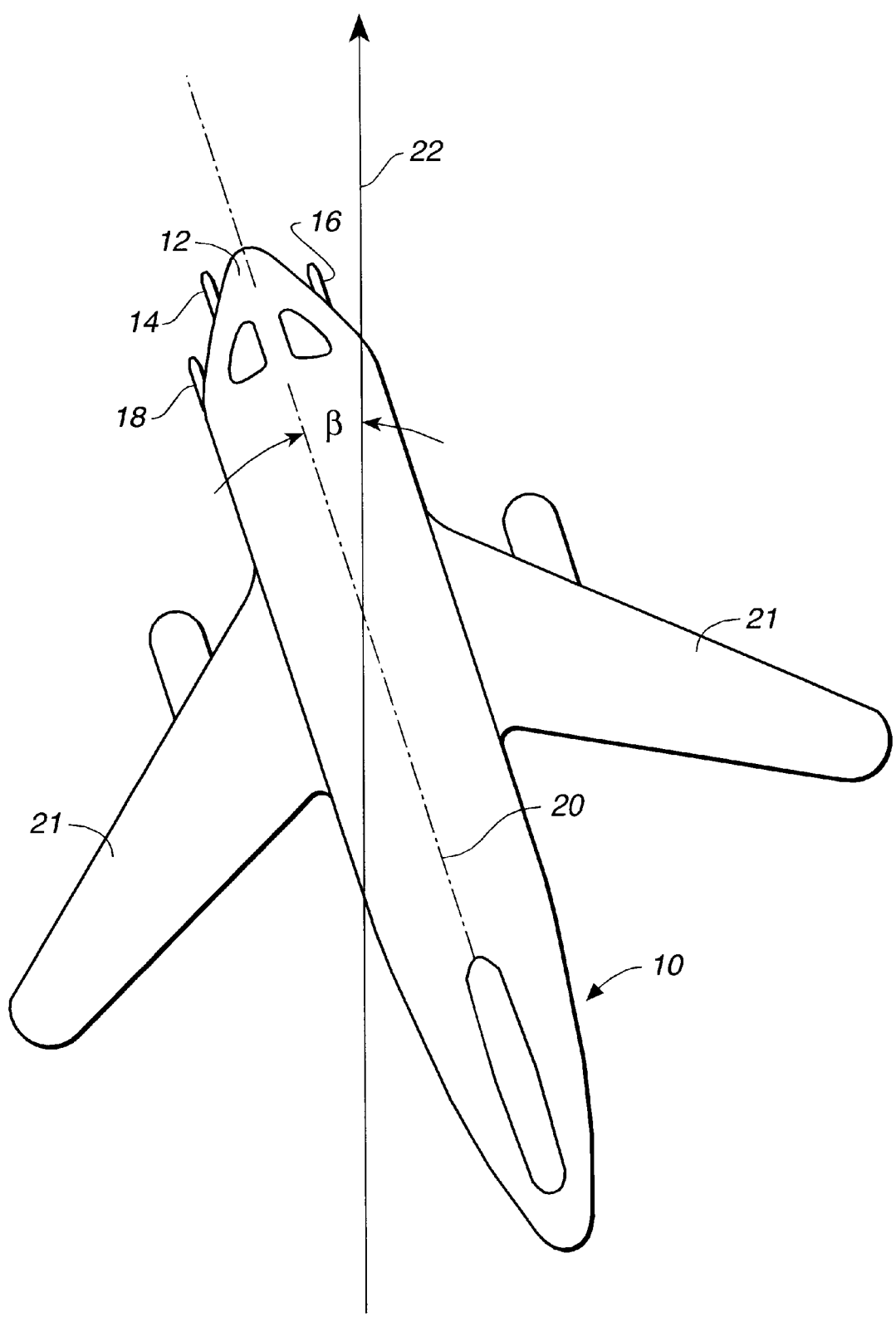
FIG._1

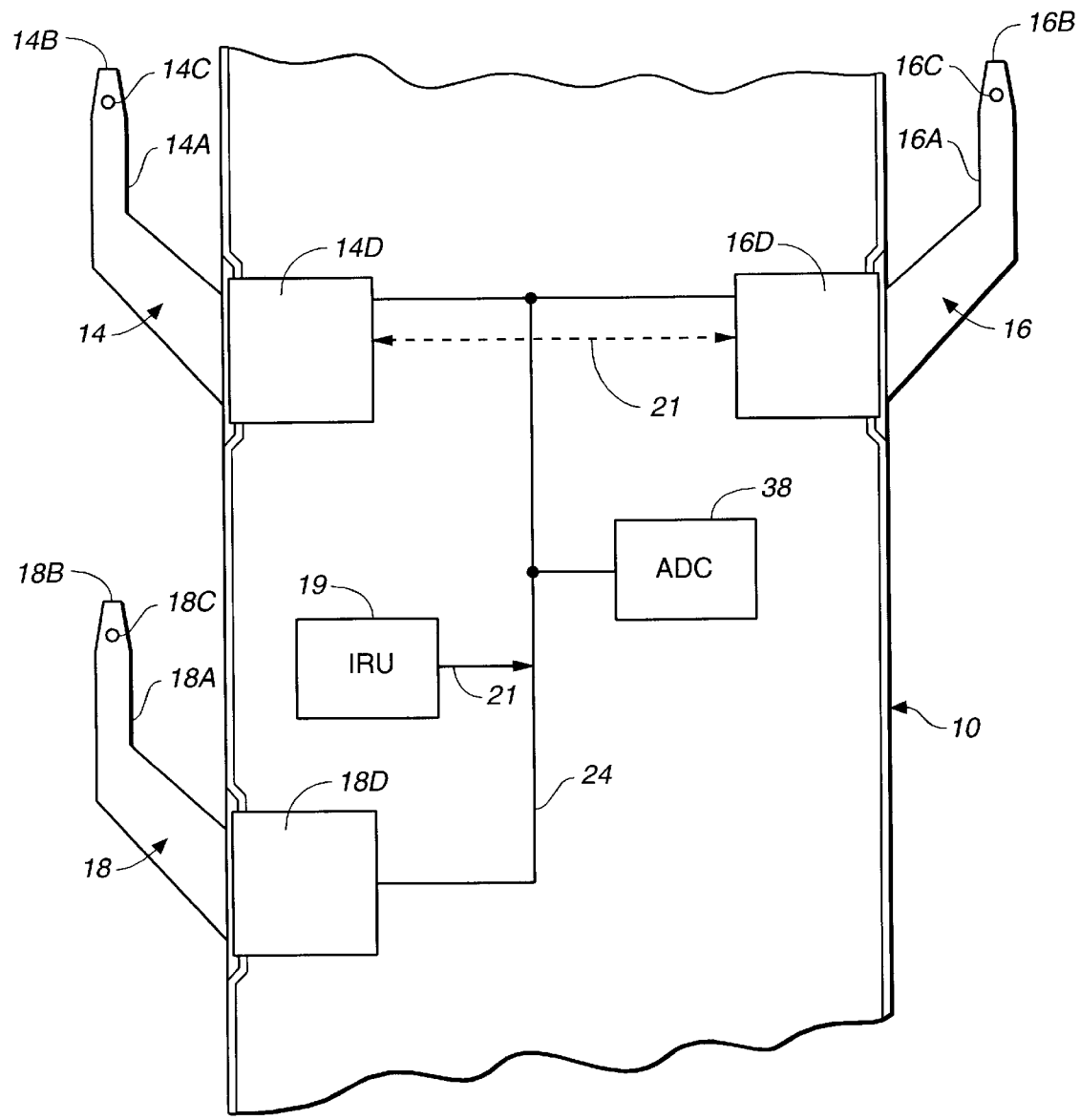
FIG._2

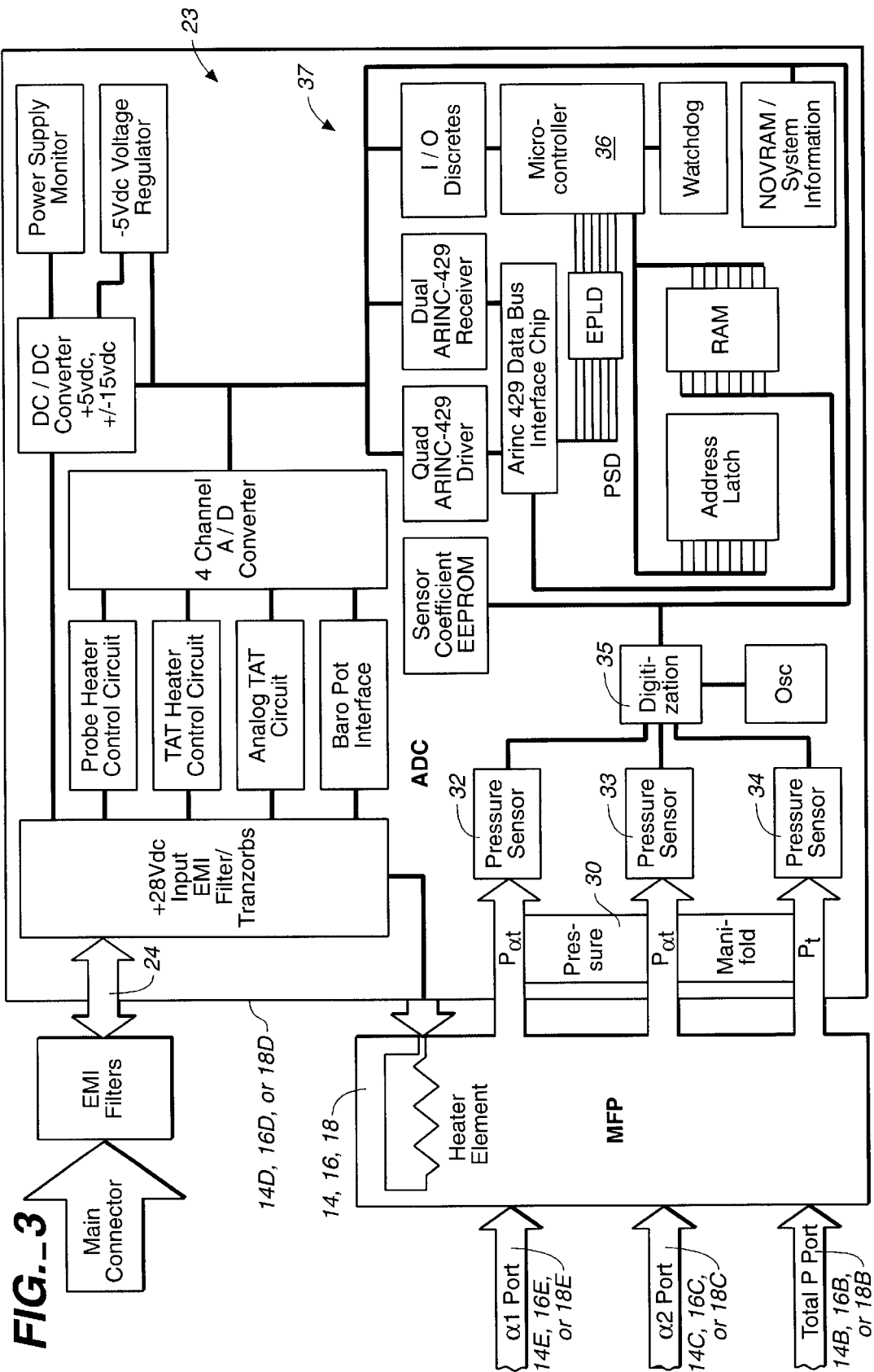
FIG._3

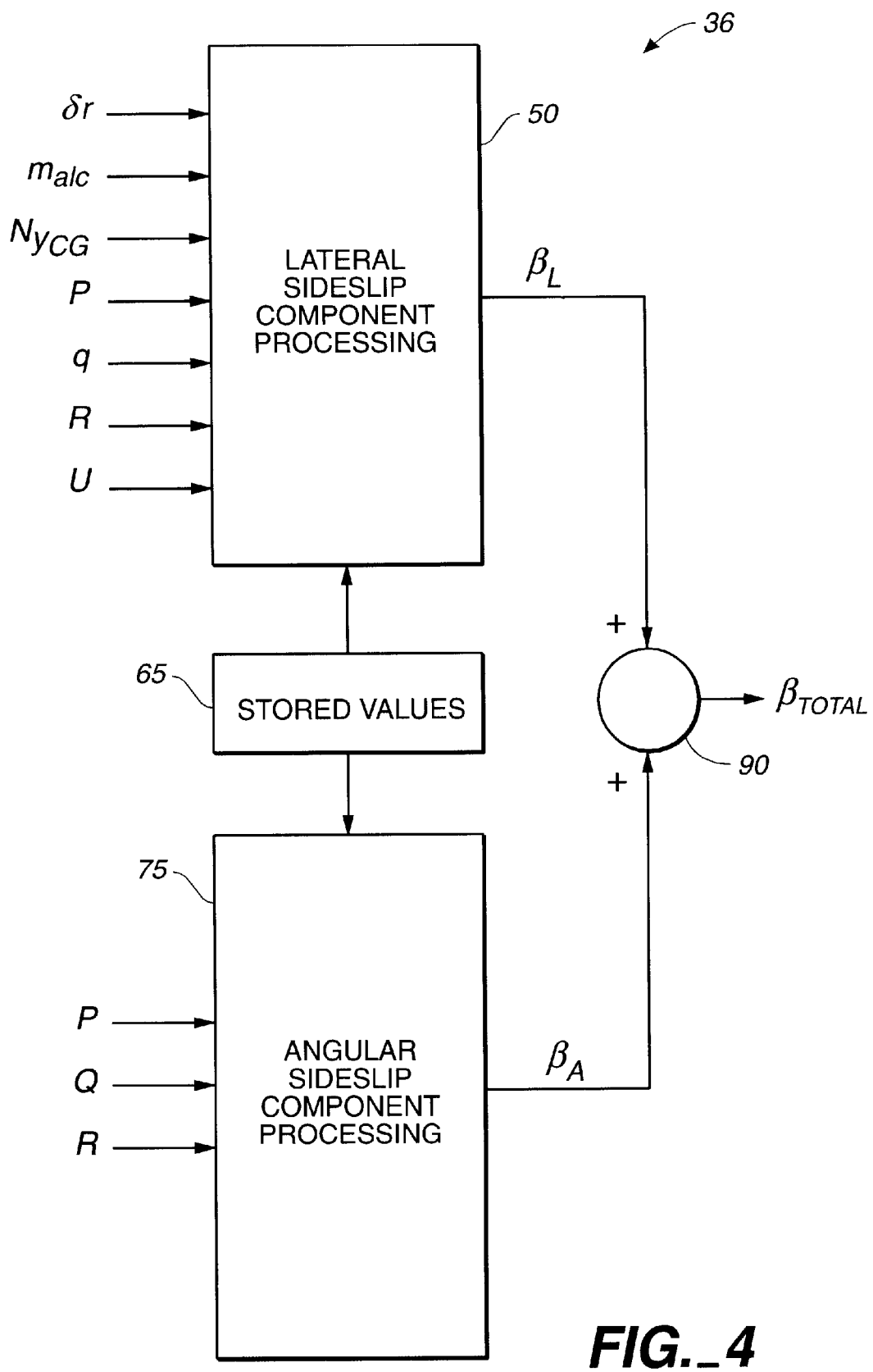
FIG._4

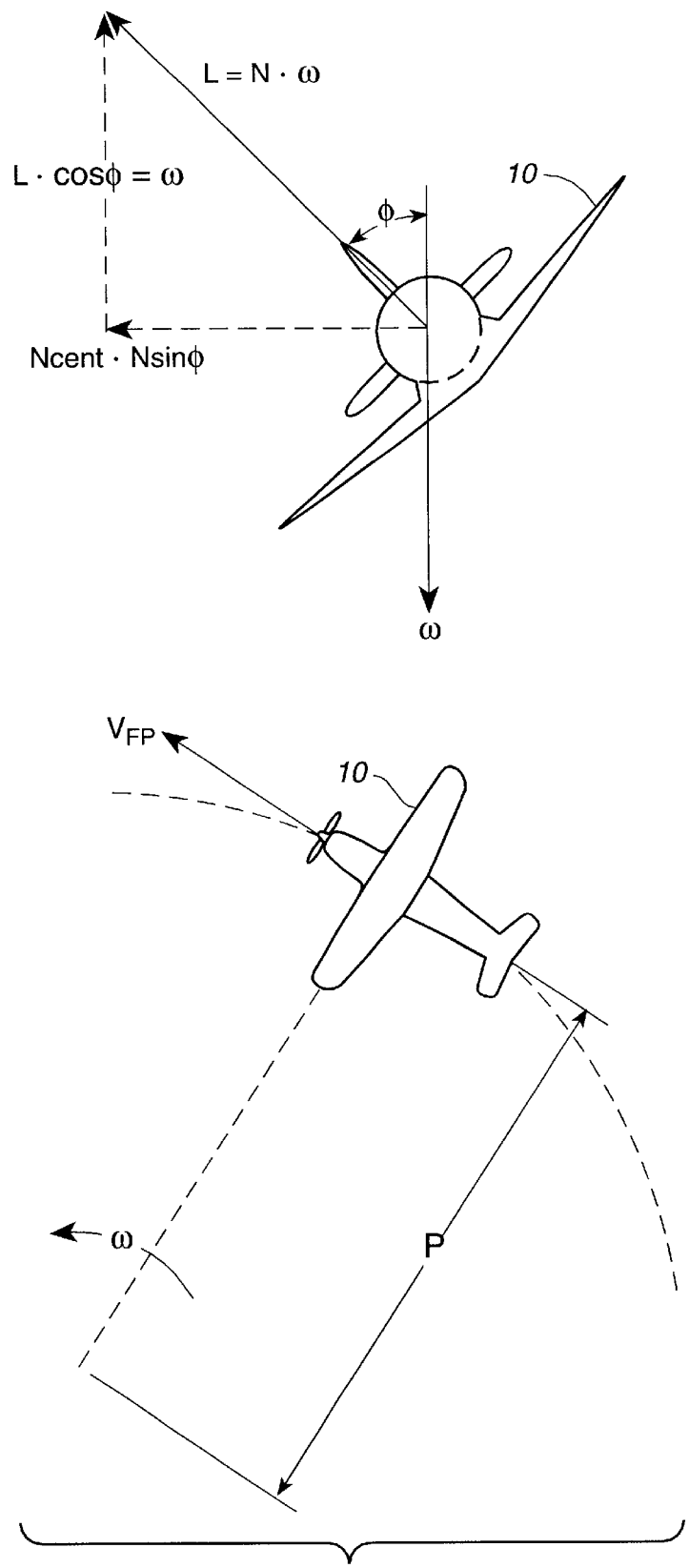
FIG._5

METHOD TO CALCULATE SIDESLIP ANGLE AND CORRECT STATIC PRESSURE FOR SIDESLIP EFFECTS USING INERTIAL INFORMATION

Cross reference is made to U.S. application Ser. No. 09/851,289, entitled "MULTI-FUNCTION AIR DATA PROBES USING NEURAL NETWORK FOR SIDESLIP COMPENSATION," filed on May 8, 2001, U.S. application Ser. No. 09/851,485, entitled "ITERATIVE METHOD OF AIRCRAFT SIDESLIP COMPENSATION FOR MULTI-FUNCTION PROBE AIR DATA SYSTEMS," filed on May 8, 2001, and U.S. application Ser. No. 09/850,796, entitled "SIDESLIP CORRECTION FOR A MULTI-FUNCTION THREE PROBE AIR DATA SYSTEM," filed on May 8, 2001.

BACKGROUND OF THE INVENTION

The present invention relates to air data systems that provide accurate compensation of sideslip of an air vehicle utilizing independent probes that are not pneumatically coupled, but which have processors for interchanging electrical signals between the probes. These probes are sometimes referred to as multi-function probes (MFPs). One type of MFP is the SmartProbe™ sold by B. F. Goodrich Company. Multi-function probes include processing circuitry located at the probe itself as part of its instrument package. During sideslip of the air vehicle, compensation of various local (to the probes) parameters or signals, such as angle of attack and static pressure, is necessary for accurate determination of aircraft angle of attack and other aircraft parameters including determination of altitude from static pressure or other means. This requirement for accuracy in altitude indications is particularly important in Reduced Vertical Separation Minimum (RVSM) space areas of the air traffic control system.

In conventional air data systems, symmetrically located probes on opposite sides of an aircraft can be pneumatically connected so that the pressure signals are averaged between the right side of the aircraft and the left side of the aircraft. This average provides a static pressure that closely approximates the necessary correction for side slip effects. In most conventional systems (pneumatically averaged systems), although corrections are made for Mach number and aircraft angle of attack, additional corrections for side slip are not done since it is assumed that the pneumatic average of local static pressure and the average of local angle of attack accomplishes this task. It is rare that this averaging technique introduces enough error to warrant additional corrections for side slip.

However, MFPs are connected only electrically in order to eliminate the need for pneumatic tubing passing between the probes on opposite sides of the aircraft or between probes on the same side of the aircraft. This means that each probe is pneumatically independent, even if it is electrically communicating with other probes. In RVSM airspace, there is a need for dual redundant systems for static pressure estimation. While information can easily be exchanged between the processing circuitry of different probes, the need for determining sideslip effect remains. In the case of symmetrically located MFPs on opposite sides of the aircraft it is possible to accomplish the same side slip compensation, as done in the traditional pneumatic systems, by averaging the pressures and angles of attack electronically. Computational fluid dynamic analysis has shown that position errors on an individual probe can be up to 600 feet per degree of sideslip in typical RVSM airspace flight conditions, for example, 41,000 feet, Mach 0.8, and a sideslip angle of 2 degrees. It is thus apparent that the sideslip effect must be corrected to obtain the necessary accuracy for certification by aviation authorities.

One possible method of determining aircraft sideslip is to utilize inertial input data from an inertial reference unit (IRU) or other inertial navigation systems. However, it has not historically been known how to implement an accurate electronic correction to air data parameters for aircraft sideslip using inertial inputs. This is due to a lack of reliable in-flight data and the necessary algorithms to incorporate inertial rates and accelerations.

SUMMARY OF THE INVENTION

The present invention relates to multi-function air data sensing systems which provide redundancy in the correction, calculation, and presentation of various air data parameters, such as aircraft angle of attack, static pressure, pressure altitude, Mach number, and indicated airspeed. Aerodynamic sideslip angle is a measure of the magnitude of a cross component of airspeed to the forward component of airspeed.

A method of the invention allows the determination of aircraft sideslip using an air data probe and an inertial reference unit. One component of aircraft sideslip angle can be attributed to the lateral accelerations and forces on the aircraft. This component will be labeled $\beta_L$. A second component of aircraft sideslip angle can be attributed to the angular rates of the aircraft's motion. This component will be labeled $\beta_A$. The lateral sideslip component ($\beta_L$) and the angular sideslip component ($\beta_A$) are combined to obtain a total sideslip angle $\beta_{TOTAL}$ for the aircraft. The total sideslip angle $\beta_{TOTAL}$ can be used to compensate static pressure, angle of attack and other aircraft parameters for sideslip effects.

BRIEF DESCRIPTION OF THE DRAWINGS

FIG. 1 is a top plan view of an aircraft illustrating a sideslip condition.

FIG. 2 is a schematic representation of a cross section of a nose portion of an aircraft showing placement of air data sensing probes called multi-function probes (MFPs) made and configured to function in accordance with the present invention in one form.

FIG. 3 is a block diagram illustrating circuitry of one or more of the MFPs, with the circuitry including an air data computer in some embodiments of the invention.

FIG. 4 is block diagram illustrating sideslip processing circuitry for calculating lateral and angular sideslip components using data from an inertial reference unit in accordance with the present invention.

FIG. 5 is a diagrammatic illustration of an aircraft which shows variables used in the derivations of equations which can be employed in accordance with the invention.

DETAILED DESCRIPTION OF THE PREFERRED EMBODIMENTS

The present invention includes methods and systems which allow accurate electronic correction to air data parameters for aircraft sideslip using inputs from an inertial reference unit (IRU). The methods, air data probes, and other systems of the present invention calculate two separate components of sideslip, a lateral component $\beta_L$ and an angular component $\beta_A$. The equations used in one embodiment to calculate these two separate components of aircraft sideslip are discussed later and were developed based upon standard equations of motion and aircraft parameters. The lateral component $\beta_L$ represents sideslip due to uncoordinated flight, while the angular component $\beta_A$ represents sideslip due to coordinated flight (i.e., an offset of the measurement device from the aircraft center of gravity). These two sideslip components can be combined to produce an effective aerodynamic sideslip angle $\beta_{TOTAL}$. These equations are discussed below in greater detail following a general discussion of air data probes and aircraft parameters.

Referring to FIG. 1, an aircraft indicated generally at 10 is shown with a nose portion 12. Mounted air data sensing probes are indicated schematically and generally at 14, 16 and 18. The positioning of aircraft 10 is with respect to the longitudinal axis (center line 20) of the aircraft. Center line 20 is shown in a greatly exaggerated sideslip condition where the path of travel of aircraft 10 is indicated at 22, and where there is a substantial angle β between the path of travel line 22 and the line or plane 20. Angle β is the aircraft angle of sideslip, which is defined herein as an aircraft parameter. The aircraft essentially is yawing to the left in FIG. 1. As the airflow passes across the aircraft, each of the probes (14, 16, 18) will be subject to different conditions, insofar as local angle of attack and local static pressure is concerned.

Another aircraft parameter is aircraft angle of attack. It also can be envisioned that if the aircraft changes angle of attack, because of the yaw angle, the amount of change in pressure on one side of the aircraft would be different than that on the other side of the aircraft. Unless the probes are symmetrically located on opposite sides of the aircraft, like with traditional pneumatic systems there is no way of averaging these changes to obtain a correct freestream static pressure reading. The sideslip angle can be used in the compensation process to correct the air data parameters for this flight in a sideslip condition.

Probes 14, 16 and 18 can be MFPs or other similar air data probes. An MFP is defined as a probe in which a computer is integrally attached as a processor to the probe, and the sensing portions of the probe itself protrude in the airstream that moves past the aircraft skin. The processor is an integrated housing immediately inside the skin. The outputs from MFPs are digital electrical signals representing pressures derived from sampling the pressure readings from internal pressure sensors. The internal pressure sensors of an MFP can be either differential sensors or absolute sensors that sense changes in pressure from a reference pressure and convert them to electrical signals that are then digitized.

In some embodiments of the invention, the sideslip determining methods disclosed herein are implemented within an air data computer (ADC) embodied in the processing circuitry integral to the probe housing, or within multiple ADCs located within multiple probes. In yet other embodiments, the methods are implemented within an ADC which is coupled to, but located remote from, the probe. References to MFPs in the following discussions are intended to include air data probes which are similar to MFPs in that they contain processing circuitry.

The probes 14, 16 and 18 may be probes such as that shown in the U.S. Pat. No. 4,378,696, or other similar patents. As shown schematically in FIG. 2, the probes have barrels 14A, 16A and 18A, with suitable ports for sensing pitot pressure at leading ends of the probes indicated at 14B, 16B and 18B. The static pressure and angle of attack sensing ports are placed symmetrically on the top and bottom of the probes. The top ports are illustrated schematically at 14C, 16C, and 18C. Mating ports are located on the lower portion. Angle of attack is measured by sensing the differential pressure between the upper port and the lower port and correlating it with the dynamic pressure measured by the pitot port (14B, 16B, 18B). The lower port on the probes will sense a pressure designated $P\alpha_1$, and the upper ports shown at 14C, 16C and 18C sense a pressure designated $P\alpha_2$. Each of the probes 14, 16 and 18 is provided with separate instrument housing 14D, 16D and 18D, respectively. While probes 14, 16 and 18 are shown in FIGS. 1 and 2, the present invention can, in some embodiments, only include two probes such as probes 14 and 16 or other combinations such as probes 16 and 18. The following examples are discussed primarily with reference to a single probe.

As shown in FIG. 2, the electronics within instrument housings 14D, 16D and 18D are electrically coupled via electrical connection 24. Electrical connection 24 can be a data bus, electrical cables, or other types of communication pathways for communicating information. Also shown in FIG. 2 is an optional remote ADC 38 within which the methods of the present invention can be implemented. However, in embodiments of the invention, the methods disclosed herein are implemented within one or more ADCs contained within the housings 14D, 16D and/or 18D associated with the probes. In these embodiments, optional ADC 38 can be omitted if desired. FIG. 2 also illustrates an inertial reference unit (IRU) 19 which provides inertial data parameters for the aircraft at output 21. The specific parameters provided by IRU 19 are discussed below in greater detail. As illustrated, IRU 19 provides these data parameters via data bus 24 for use by one or more of the probes, or by a separate ADC, in calculating sideslip. Other parameters used in the calculation of sideslip are provided to probes 14, 16 and 18 and/or ADC 38 in a similar manner.

The arrangement of the probe circuitry in one example embodiment of an MFP or other air data probe is shown in block diagram form in FIG. 3. Circuitry 23 is shown schematically coupled to a probe (14, 16 or 18) which is labeled as a multi-function probe (MFP). Circuitry 23 is positioned within the corresponding housing 14D, 16D and 18D, and in the illustrated embodiment comprises an air data computer (ADC). Inputs are illustrated schematically as the $\alpha_1$ pressure port 14E, 16E or 18E, $\alpha_2$ pressure port 14C, 16C, or 18C, and the total pressure port 14B, 16B or 18B. The $\alpha_2$ pressure port and total pressure port correspond to those shown in FIG. 2 for probes 14, 16 and 18. The $\alpha_1$ pressure port corresponds to the lower port (not shown in FIG. 2) on the probes.

These pressures are transmitted through a manifold 30 to individual pressure sensors 32, 33 and 34, respectively. The outputs of pressure sensors 32, 33 and 34 are provided to analog-to-digital converter 35 for digitization. Processing and communications circuitry 37 includes a microcontroller 36 and related memory and communications circuits all forming part of the ADC (i.e., circuitry 23). The ADC can also include other circuits and devices such as electromagnetic filters for reducing EMI interference, heater control circuits, and power supplies. Air data computer or circuitry 23 also includes and/or is coupled to data bus 24 for receiving information from, or transmitting information to, IRU 19, other probes in the system, or other aircraft sensors or systems. The methods of the present invention can be implemented within the air data computers of one or more of probes 14, 16 and 18, or can be implemented in a separate and remotely positioned air data computer such as ACD 38 shown in FIG. 2.

In accordance with the present invention, the processing circuitry of one or more of probes 14, 16 and 18, or the processing circuitry within a separate ADC 38, calculates separate lateral and angular components of sideslip. FIG. 4 is a block diagram which illustrates the separate lateral and angular sideslip component processing in a diagrammatic fashion. It must be understood, however, that the separate processing illustrated in FIG. 4 can be implemented within the same processing circuitry 36 (FIG. 3). Further, some of the inputs to the lateral and angular sideslip component processing functions shown in FIG. 4 can themselves be calculated by processing circuitry 36. Other inputs are provided to the processing circuitry via a data bus or electrical connection 24 from other sensors or systems of the aircraft.

As shown in FIG. 4, processing circuitry 36 is programmed to implement lateral sideslip component processing functions 50 and angular sideslip component processing functions 75. The illustrated inputs to each of the functions are either provided to processing circuitry 36 (for example via data bus 24 as described above) or are generated by the processing circuitry. Other inputs are constants stored in memory of processing circuitry 36 (illustrated as stored values 65 in FIG. 4). Still others can be selected from a series of stored parameter values selected by processing circuitry 36. All of these inputs are discussed below with reference to FIG. 4 and associated Equations.

A lateral sideslip $\beta_L$ equation, such as the one illustrated in Equation 1, can be implemented by processing circuitry 36 to embody lateral component processing 50 shown in FIG. 4.

$$\beta_L = \frac{m_{a/c} \cdot Ny}{q_c \cdot S \cdot Cy_\beta} - \frac{Cy_{\delta r} \cdot \delta r + Cy_P \cdot \frac{bP}{2U} + Cy_R \cdot \frac{bR}{2U}}{Cy_\beta} \quad \text{Equation 1}$$

Where, $\delta r$=the rudder input (rad), for example provided over data bus 24 from a rudder positions sensor;

b=the wing span of the aircraft (meters), which is a constant stored in values 65;

$Cy_\beta$=the lateral force derivative with respect to $\beta$ (1/radian), which is a constant or a function stored in values 65;

$Cy_{\delta r}$=the lateral force derivative with respect to rudder input (1/rad), which is a constant or a function stored in values 65;

$Cy_P$=the lateral force derivative with respect to roll rate (1/rad), which is a constant or a function stored in values 65;

$Cy_R$=the lateral force derivative with respect to yaw rate (1/rad), which is a constant or a function stored in values 65;

$m_{a/c}$=the aircraft mass (kg), which can be a sensed or calculated parameter, for example provided over data bus 24 (will vary as function of cargo and of remaining fuel);

Ny=the body lateral acceleration (m/s$^2$) measured by IRU 19 or a version of the body lateral acceleration measured by the IRU and compensated to the aircraft center of gravity;

P=the roll rate (rad/s) measured by IRU 19;

$q_c$=the dynamic pressure rise (N/m$^2$) (difference between total pressure, as measured by the probe and freestream static pressure);

S=the wing reference area (m$^2$) (total planform wing area), which is a constant stored in values 65;

R=the yaw rate (rad/s) measured by IRU 19; and

U=the longitudinal true airspeed (m/s) as calculated by the probe as a function of total air temperature and impact pressure.

The angular sideslip component processing functions 75 reflect a kinematic derivation of $\beta_A$ with respect to roll (P), pitch (Q) and yaw (R) of the aircraft. A discussion of the derivation follows. Portions of the derivation are more fully understood by referring to the diagrams of an aircraft shown in FIG. 5.

A load factor N (in g's) can be defined using the relationship of Equation 2 where $\phi$ is the roll angle (see FIG. 5) in radians of the aircraft.

$$N = \frac{1}{\cos\phi} \quad \text{Equation 2}$$

As shown in Equation 3, a centripetal load factor $N_{cent}$ (in g's) in the plane of the flight path arc can be defined using the relationship:

$$N_{cent} = N \cdot \sin\phi = \frac{1}{\cos\phi} \cdot \sin\phi = \tan\phi \quad \text{Equation 3}$$

Centripetal acceleration $a_{cent}$ can be defined using the relationship demonstrated in Equation 4 where g (m/s$^2$) is the acceleration due to gravity.

$$N_{cent} \cdot g = \tan\phi \cdot g = a_{cent} \quad \text{Equation 4}$$

Track angle rate $\omega$ (rad/sec) can be defined using Equation 5:

$$\omega = \sqrt{\frac{a_{cent}}{P}} \quad \text{Equation 5}$$

$$= \sqrt{\frac{\tan\phi \cdot g}{P}}$$

Then, Kinematic relations for roll (P), pitch (Q) and yaw (R) (all in rad/sec) can be defined as shown in Equations 6A, 6B and 6C:

$$P = -w \sin\theta \quad \text{Equation 6A}$$

$$Q = w \sin\phi \cos\theta \quad \text{Equation 6B}$$

$$R = w \cos\phi \cos\theta \quad \text{Equation 6C}$$

Equation 6C can be rearranged as shown in Equation 7:

$$\omega = \frac{R}{\cos\phi \cos\theta} \quad \text{Equation 7}$$

Track angle rate $\omega$ can also be defined by the relationship shown in Equation 8 in which VFP (m/sec) is the flight path velocity and $\rho$ (m) is the radius of turn due to rates only.

$$\omega = \frac{V_{FP}}{\rho} \quad \text{Equation 8}$$

Therefore, Equations 7 and 8 can be combined as shown in Equation 9:

$$\rho = \frac{V_{FP}}{R} \cos\phi \cos\theta \quad \text{Equation 9}$$

Further substitutions can result in the relationship shown in Equation 10:

$$\omega = \sqrt{\frac{g \cdot \tan\phi \cdot R}{V_{FP} \cdot \cos\phi \cos\theta}} \qquad \text{Equation 10}$$

Considering kinematic β purely as a function of yaw rate R, Equations 11 and 12 can be shown to be true where $x_p$ (m) is the distance of the probe from the aircraft center of gravity.

$$R = \frac{\sin\beta_A \cdot V_{FP} \cdot \cos\theta}{x_p} \qquad \text{Equation 11}$$

$$\frac{g \cdot \sin\phi \cdot x_p}{V_{FP}^2} = \sin\beta_A \qquad \text{Equation 12}$$

From the Euler equations shown in Equations 13, 14 and 15 (where η is the pitch angle of the aircraft), and assuming the relationship shown in Equation 16, the relationship shown in Equation 17 can be derived.

$$\cos\theta = \sqrt{\frac{Q^2 + R}{\omega}} \qquad \text{Equation 13}$$

$$\sin\phi = \frac{Q}{\sqrt{Q^2 + R^2}} \qquad \text{Equation 14}$$

$$\tan\phi = \frac{Q}{R} \qquad \text{Equation 15}$$

$$w = \sqrt{R^2 + P^2 + Q^2} \qquad \text{Equation 16}$$

$$V = \frac{g \cdot \tan\phi}{\sqrt{R^2 + P^2 + Q^2}} \qquad \text{Equation 17}$$

From Equation 17, the angular sideslip rate equation for β can be defined using Equation 18.

$$\sin\beta_A = \frac{x_p \cdot R^2(R^2 + P^2 + Q^2)}{g \cdot Q \cdot \sqrt{Q^2 + R^2}} \qquad \text{Equation 18}$$

Equation 17 can be solved for $\beta_A$ as shown in Equation 19:

$$\beta_A = \sin^{-1}\left(\frac{x_p \cdot R^2 \cdot (P^2 + Q^2 + R^2)}{g \cdot Q \cdot \sqrt{Q^2 + R^2}}\right) \qquad \text{Equation 19}$$

As shown in FIG. 4, the lateral and angular angles of sideslip $\beta_L$ and $\beta_A$ are added at summation node 90 to produce a total sideslip angle $\beta_{TOTAL}$. This total sideslip angle can then be used to compensate static pressure measurements and other air data parameters. This allows more accurate measurement of altitude, airspeed, and angle of attack.

Although the present invention has been described with reference to preferred embodiments, workers skilled in the art will recognize that changes may be made in form and detail without departing from the spirit and scope of the invention.

What is claimed is:

1. A method of determining sideslip of an aircraft using an air data probe and an inertial reference unit, the method comprising:

receiving inertial flight information from the inertial reference unit;

calculating a lateral sideslip component $\beta_L$ of the aircraft as a function of the inertial flight information;

calculating an angular sideslip component $\beta_A$ of the aircraft as a function of the inertial flight information; and combining the lateral sideslip component $\beta_L$ and the angular sideslip component $\beta_A$ to obtain a total sideslip angle $\beta_{TOTAL}$ for the aircraft.

2. The method of claim 1, wherein receiving inertial flight information from the inertial reference unit includes receiving a body lateral acceleration Ny, a roll rate P, a yaw rate R, and a pitch rate Q for the aircraft.

3. The method of claim 2, wherein calculating the lateral sideslip component $\beta_L$ of the aircraft as a function of the inertial flight information further comprises calculating the lateral sideslip component $\beta_L$ as a function of the body lateral acceleration Ny, the role rate P and the pitch rate Q for the aircraft.

4. The method of claim 3, wherein calculating the lateral sideslip component $\beta_L$ of the aircraft as a function of the inertial flight information further comprises calculating the lateral sideslip component $\beta_L$ as a function of a dynamic pressure rise $q_c$ measured by an air data probe.

5. The method of claim 4, wherein calculating the lateral sideslip component $\beta_L$ of the aircraft as a function of the inertial flight information further comprises calculating the lateral sideslip component $\beta_L$ as a function of a lateral force derivative $Cy_\beta$ of the aircraft with respect to $\beta_L$, as a function of a rudder input δr, as a function of a lateral force derivative $Cy_{\delta r}$ of the aircraft with respect to the rudder input δr, as a function of a lateral force derivative $Cy_P$ of the aircraft with respect to the roll rate P, and a lateral force derivative $Cy_R$ of the aircraft with respect to the yaw rate R.

6. The method of claim 5, wherein calculating the lateral sideslip component $\beta_L$ of the aircraft as a function of the inertial flight information further comprises calculating the lateral sideslip component $\beta_L$ as a function of a wing span b of the aircraft, as a function of a wing reference area S of the aircraft, as a function of a longitudinal true airspeed U of the aircraft, and as a function of a mass $m_{a/c}$ of the aircraft.

7. The method of claim 6, wherein calculating the lateral sideslip component $\beta_L$ of the aircraft as a function of the inertial flight information comprises calculating the lateral sideslip component $\beta_L$ using the relationship:

$$\beta_L = \frac{m_{a/c} \cdot Ny}{q_c \cdot S \cdot Cy_\beta} - \frac{Cy_{\delta r} \cdot \delta r + Cy_P \cdot \frac{bP}{2U} + Cy_R \cdot \frac{bR}{2U}}{Cy_\beta}.$$

8. The method of claim 2, wherein calculating the angular sideslip component $\beta_A$ of the aircraft as a function of the inertial flight information further comprises calculating the angular sideslip component $\beta_A$ as a function of the roll rate P, the yaw rate R, and the pitch rate Q for the aircraft.

9. The method of claim 8, wherein calculating the angular sideslip component $\beta_A$ of the aircraft as a function of the inertial flight information further comprises calculating the angular sideslip component $\beta_A$ as a function of a distance $x_p$ of the air data probe from a center of gravity of the aircraft.

10. The method of claim 9, wherein calculating the angular sideslip component $\beta_A$ of the aircraft as a function of the inertial flight information further comprises calculating the angular sideslip component $\beta_A$ as a function of the acceleration due to gravity g.

11. The method of claim 10, wherein calculating the angular sideslip component $\beta_A$ of the aircraft as a function of the inertial flight information further comprises calculating the angular sideslip component $\beta_A$ using the relationship:

$$\beta_A = \sin^{-1}\left(\frac{x_p \cdot R^2 \cdot (P^2 + Q^2 + R^2)}{g \cdot Q \cdot \sqrt{Q^2 + R^2}}\right).$$

12. A multi-function probe configured to implement the method of claim 1.

13. A system for determining sideslip of an aircraft having an inertial reference unit which provides inertial flight information, the system comprising:
   means for receiving the inertial flight information from the inertial reference unit;
   means for calculating a lateral sideslip component $\beta_L$ of the aircraft as a function of the inertial flight information, the means for calculating the lateral sideslip component $\beta_L$ being coupled to the inertial reference unit;
   means for calculating an angular sideslip component $\beta_A$ Of the aircraft as a function of the inertial flight information, the means for calculating the angular sideslip component $\beta_A$ being coupled to the inertial reference unit; and
   means for combining the lateral sideslip component $\beta_L$ and the angular sideslip component $\beta_A$ to obtain a total sideslip angle $\beta_{TOTAL}$ for the aircraft, wherein the means for combining is coupled to the means for calculating the lateral sideslip component $\beta_L$ of the aircraft and the means for calculating the angular sideslip component $\beta_A$ of the aircraft.

14. The system of claim 13, wherein the inertial flight information from the inertial reference unit includes a body lateral acceleration Ny, a roll rate P, a yaw rate R, and a pitch rate Q for the aircraft.

15. The system of claim 14, wherein the means for calculating the lateral sideslip component $\beta_L$ of the aircraft as a function of the inertial flight information is arranged to calculate the lateral sideslip component $\beta_L$ as a function of the body lateral acceleration Ny, the role rate P and the pitch rate Q for the aircraft.

16. The system of claim 15, wherein the means for calculating the lateral sideslip component $\beta_L$ of the aircraft as a function of the inertial flight information is arranged to calculate the lateral sideslip component $\beta_L$ as a function of a dynamic pressure rise $q_c$ measured by an air data probe.

17. The system of claim 16, wherein the means for calculating the lateral sideslip component $\beta_L$ of the aircraft as a function of the inertial flight information is arranged to calculate the lateral sideslip component $\beta_L$ as a function of a lateral force derivative $Cy_\beta$ of the aircraft with respect to $\beta_L$, as a function of a rudder input $\delta r$, as a function of a lateral force derivative $Cy_{\delta r}$ of the aircraft with respect to the rudder input $\delta r$, as a function of a lateral force derivative $Cy_P$ of the aircraft with respect to the roll rate P, and a lateral force derivative $Cy_R$ of the aircraft with respect to the yaw rate R.

18. The system of claim 17, wherein the means for calculating the lateral sideslip component $\beta_L$ of the aircraft as a function of the inertial flight information calculates the lateral sideslip component $\beta_L$ as a function of a wing span b of the aircraft, as a function of a wing reference area S of the aircraft, as a function of a longitudinal true airspeed U of the aircraft, and as a function of a mass $m_{a/c}$ of the aircraft.

19. The system of claim 18, wherein the means for calculating the lateral sideslip component $\beta_L$ of the aircraft as a function of the inertial flight information calculates the lateral sideslip component $\beta_L$ using the relationship:

$$\beta_L = \frac{m_{a/c} \cdot Ny}{q_c \cdot S \cdot Cy_\beta} - \frac{Cy_{\delta r} \cdot \delta r + Cy_P \cdot \frac{bP}{2U} + Cy_R \cdot \frac{bR}{2U}}{Cy_\beta}.$$

20. The system of claim 14, wherein the means for calculating the angular sideslip component $\beta_A$ of the aircraft as a function of the inertial flight information calculates the angular sideslip component $\beta_A$ as a function of the roll rate P, the yaw rate R, and the pitch rate Q for the aircraft.

21. The system of claim 20, wherein the means for calculating the angular sideslip component $\beta_A$ of the aircraft as a function of the inertial flight information calculates the angular sideslip component $\beta_A$ as a function of a distance $x_p$ of the air data probe from a center of gravity of the aircraft.

22. The system of claim 21, wherein the means for calculating the angular sideslip component $\beta_A$ of the aircraft as a function of the inertial flight information calculates the angular sideslip component $\beta_A$ as a function of the acceleration due to gravity g.

23. The system of claim 22, wherein the means for calculating the angular sideslip component $\beta_A$ of the aircraft as a function of the inertial flight information calculates the angular sideslip component $\beta_A$ using the relationship:

$$\beta_A = \sin^{-1}\left(\frac{x_p \cdot R^2 \cdot (P^2 + Q^2 + R^2)}{g \cdot Q \cdot \sqrt{Q^2 + R^2}}\right).$$

* * * * *